Jan. 10, 1939.   C. F. DAWSON   2,143,122
SHOCK ABSORBER PAD FOR FIREMEN'S POLES
Filed July 25, 1938
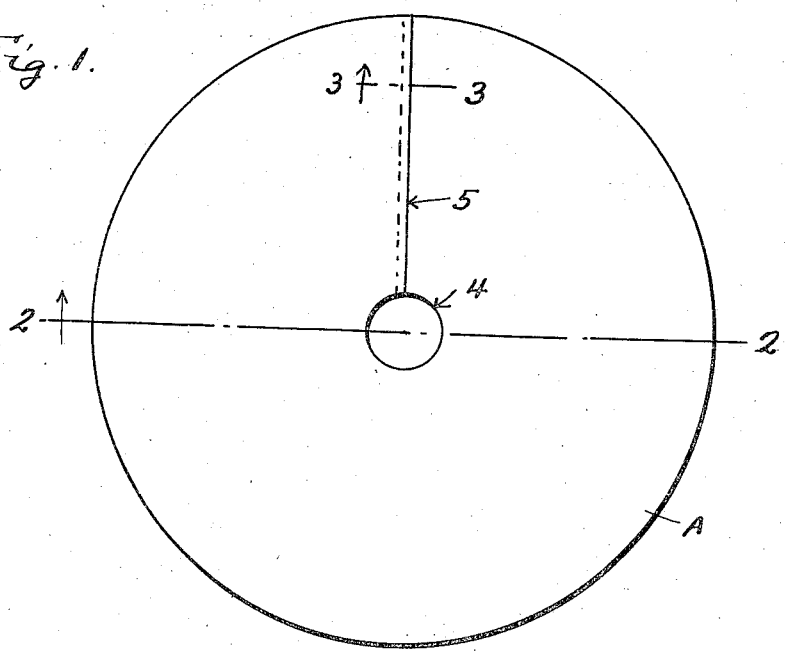
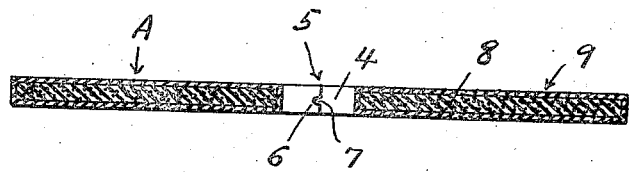
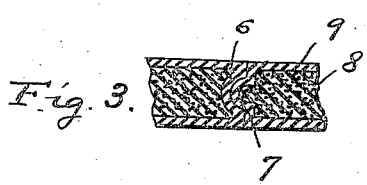
Inventor
Clinton F. Dawson
By Clarence A. O'Brien
and Hyman Berman
Attorneys Patented Jan. 10, 1939

2,143,122

UNITED STATES PATENT OFFICE 2,143,122

SHOCK ABSORBER PAD FOR FIREMEN'S POLES

Clinton F. Dawson, Kansas City, Mo.

Application July 25, 1938, Serial No. 221,256

1 Claim. (Cl. 227—42)

This invention relates to a shock absorber pad adapted to be placed around the lower end of the pole which firemen slide down in fire engine houses, the general object of the invention being to provide means for absorbing the shock when the fireman strikes the floor in sliding down the pole so as to prevent injury to the fireman.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a top plan view of the pad.

Figure 2 is a section on the line 2—2 of Figure 1.

Figure 3 is a section on the line 3—3 of Figure 1.

In this drawing the letter A indicates the pad which is preferably of circular shape and which has a hole 4 therein at its center through which the pole passes. A slit 5 extends straight from the hole through a part of the periphery of the pad and one side of the slit is formed with a groove 6 and the other side with a rib 7 which fits in the groove. This slit enables the parts to be separated so that the pad can be placed around the lower end of the pole. The pad is composed of an inner part 8 of sponge rubber which is entirely covered by a covering 9 of relatively hard rubber so that the sponge rubber is entirely enclosed in the hard rubber, the hard rubber sealing the sponge rubber in an air-tight manner, thus providing an air cushion.

In descending a pole the legs of a fireman should be bent as he strikes the floor so that the bent legs act as a spring to absorb shock when the fireman's feet strike the floor and unless this is done injury to the ankles or legs may result. Some times, particularly where the fireman is awakened from a sound sleep, the fireman fails to so bend his legs and it is known that broken ankles or sprained ankles and legs result when a fireman fails to so bend his legs. However, with this pad the shock of the feet striking the floor is absorbed by the pad and injury to the fireman is prevented.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A shock absorbing pad for firemen's pole comprising a pad having a centrally arranged hole therein through which the lower end of the pole passes, and a slit extending from the hole to a peripheral portion of the pad for enabling the pad to be placed around the pole, one wall of the slit having a groove therein and the opposite wall having a rib for entering the groove.

CLINTON F. DAWSON.